(12) United States Patent
Colletti (10) Patent No.: US 10,562,635 B2
(45) Date of Patent: Feb. 18, 2020

(54) PERSONAL DEVICE CARRIER AND A PASSENGER SEAT

(71) Applicant: The Boeing Company, Chicago, IL (US)

(72) Inventor: Brian P. Colletti, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/924,465

(22) Filed: Mar. 19, 2018

(65) Prior Publication Data

US 2019/0283881 A1   Sep. 19, 2019

(51) Int. Cl.
| | |
|---|---|
| *A47B 3/14* | (2006.01) |
| *B64D 11/06* | (2006.01) |
| *B60R 11/02* | (2006.01) |
| *B60N 3/00* | (2006.01) |
| *B63B 29/04* | (2006.01) |
| *B60R 11/00* | (2006.01) |
| *B61D 33/00* | (2006.01) |
| *B60N 2/24* | (2006.01) |

(52) U.S. Cl.
CPC .......... *B64D 11/0638* (2014.12); *B60N 3/004* (2013.01); *B60R 11/02* (2013.01); *B64D 11/0636* (2014.12); *B60N 2/242* (2013.01); *B60R 2011/0015* (2013.01); *B61D 33/0007* (2013.01); *B63B 29/04* (2013.01); *B63B 2029/043* (2013.01)

(58) Field of Classification Search
CPC ...... B64D 11/0638; B60N 3/004; B60R 11/02
USPC ....................... 297/146, 163, 188.04, 188.07
See application file for complete search history.

(56) References Cited

U.S. PATENT DOCUMENTS

| | | | | |
|---|---|---|---|---|
| 3,795,422 A | * | 3/1974 | Robinson | A47C 7/70 297/146 X |
| 6,679,188 B1 | * | 1/2004 | Spagnoli, Jr. | B60N 3/004 108/152 |
| 8,667,904 B2 | * | 3/2014 | Pajic | A47B 23/00 297/146 X |
| 8,826,830 B2 | * | 9/2014 | Pajic | B64D 11/0015 297/163 X |
| 8,881,659 B2 | * | 11/2014 | Ackeret | B60N 3/002 108/44 |
| 8,934,063 B2 | * | 1/2015 | Boyer, Jr. | H04N 5/655 297/146 X |
| 9,067,682 B2 | * | 6/2015 | Pajic | A47B 23/00 |
| 9,167,905 B2 | * | 10/2015 | Pajic | B64D 11/0015 |

(Continued)

FOREIGN PATENT DOCUMENTS

| | | | | |
|---|---|---|---|---|
| FR | 2982218 A1 | * | 5/2013 | B60N 3/004 |
| WO | WO-2007123615 A1 | * | 11/2007 | A47B 23/043 |
| WO | WO-2017048319 A1 | * | 3/2017 | B60N 3/002 |

*Primary Examiner* — Rodney B White
(74) *Attorney, Agent, or Firm* — Ostrager Chong Flaherty & Broitman P.C.

(57) ABSTRACT

A personal device carrier for a passenger seat. The personal device carrier has a backing plate integrated into a backside of the passenger seat and a folding tray assembly with a base adjustably coupled to the backing plate for vertical movement of the folding tray assembly relative to the backing plate. The folding tray assembly includes a tray rotationally mounted to the base and movable between a generally vertical stowed position and a generally horizontal deployed position for holding a personal device.

16 Claims, 5 Drawing Sheets

(56) References Cited

U.S. PATENT DOCUMENTS

| | | | |
|---|---|---|---|
| 9,168,876 B2* | 10/2015 | Pajic | A47B 23/00 |
| 9,403,464 B2* | 8/2016 | Valcic | B60N 3/004 |
| 9,403,596 B2* | 8/2016 | Pajic | B64D 11/0638 |
| 9,409,647 B2* | 8/2016 | Pajic | B64D 11/0015 |
| 9,457,725 B2* | 10/2016 | McClain | B60N 3/004 |
| 9,481,465 B2* | 11/2016 | Pajic | B64D 11/0015 |
| 9,796,344 B2* | 10/2017 | Pajic | B60R 11/0252 |
| 10,029,792 B2* | 7/2018 | Heredia | B64D 11/0015 |
| 2002/0043826 A1* | 4/2002 | Ingram | B60N 3/004 |
| | | | 297/146 |
| 2005/0178297 A1* | 8/2005 | Pipkin | A47B 23/00 |
| | | | 108/25 |
| 2006/0175882 A1* | 8/2006 | Schweizer | B60N 3/004 |
| | | | 297/146 X |
| 2009/0008969 A1* | 1/2009 | Caturla | B60R 11/0235 |
| | | | 297/163 |
| 2011/0278885 A1* | 11/2011 | Procter | B60R 11/0235 |
| | | | 297/188.04 X |
| 2012/0313404 A1* | 12/2012 | Ackeret | B60N 3/002 |
| | | | 297/163 |
| 2013/0169009 A1 | 7/2013 | Petersen et al. | |
| 2013/0314861 A1* | 11/2013 | Burford | H05K 7/00 |
| | | | 297/163 X |
| 2013/0327255 A1* | 12/2013 | Pajic | A47B 23/00 |
| | | | 108/25 |
| 2014/0183238 A1* | 7/2014 | Lin | B60R 11/02 |
| | | | 224/483 |
| 2014/0311388 A1* | 10/2014 | Korpi | A47B 23/001 |
| | | | 108/6 |
| 2015/0020715 A1* | 1/2015 | Pajic | B64D 11/00152 |
| | | | 108/3 |
| 2015/0068434 A1* | 3/2015 | Pajic | A47B 23/00 |
| | | | 108/25 |
| 2015/0108798 A1* | 4/2015 | Boyer, Jr. | B64D 11/0638 |
| | | | 297/163 |
| 2015/0175265 A1* | 6/2015 | Thiele | B64D 11/06 |
| | | | 297/163 |
| 2016/0009394 A1* | 1/2016 | Felske | B64D 11/0627 |
| | | | 297/163 |
| 2016/0039349 A1* | 2/2016 | Casagrande | G06F 1/1633 |
| | | | 248/205.1 |
| 2016/0039525 A1* | 2/2016 | Pajic | B64D 11/0638 |
| | | | 108/44 |
| 2016/0143435 A1* | 5/2016 | Kim | B60N 3/004 |
| | | | 248/447.1 |
| 2016/0355263 A1 | 12/2016 | Pozzi et al. | |
| 2017/0072872 A1* | 3/2017 | Balmer | F16M 13/022 |
| 2017/0088265 A1* | 3/2017 | Brick | B64D 11/00152 |
| 2017/0090645 A1* | 3/2017 | Shih | B64D 11/00151 |
| 2017/0096224 A1* | 4/2017 | Marom | B64D 11/0642 |
| 2017/0135468 A1* | 5/2017 | Johnson | A47B 23/02 |
| 2017/0237843 A1* | 8/2017 | Ackeret | H04M 1/04 |
| | | | 455/575.9 |
| 2017/0291710 A1* | 10/2017 | Barr-Perea | B64D 11/0636 |
| 2018/0118343 A1* | 5/2018 | Castaing | B64D 11/00152 |
| 2018/0281967 A1* | 10/2018 | Stephens | B64D 11/0636 |
| 2018/0319306 A1* | 11/2018 | Newbold | B64D 11/0638 |
| 2019/0061953 A1* | 2/2019 | Fishel | B64D 11/0638 |
| 2019/0176989 A1* | 6/2019 | Flores Aguirre | B64D 11/00152 |

\* cited by examiner

PERSONAL DEVICE CARRIER AND A PASSENGER SEAT

TECHNICAL FIELD

This disclosure relates generally to vehicular passenger seats and, more particularly, to a personal device carrier integrated into a backside of a passenger seat.

BACKGROUND

Typical vehicle passenger seats, for example, aircraft passenger seats, include a pivotally mounted seatback food tray table that can be stowed against the seatback (or backside of the seat) and moved down and away from the seatback into a generally horizontal position for use by a passenger seated in a seat immediately aft of the passenger seat. Such tray tables can be positioned relatively close to the passenger's lap when seated to accommodate food and drinks, and otherwise provide a work surface. Personal devices, such as smartphones, tablets, laptops and other electronic equipment, are now permitted to be used during flight. But, typical tray tables are typically positioned too low for all passengers (e.g., adults, teens, and children) to comfortably use and view such personal devices without holding the personal device.

SUMMARY

A personal device carrier for a passenger seat that is adjustable in a vertical direction is disclosed herein. The personal device carrier includes a backing plate that is integrated into a backside of the passenger seat and a folding tray assembly having a base adjustably coupled to the backing plate for vertical movement of the folding tray assembly relative to the backing plate. The folding tray assembly has a tray that is rotationally or pivotally mounted to a bottom edge of the base of the folding tray assembly such that the tray is movable between a generally vertical stowed position against the base of the folding tray assembly and a generally horizontal deployed position folded down and away from the base of the folding tray assembly. In the deployed position, the tray can hold a personal device in an upright orientation and can be adjusted in a vertical direction to position the personal device in a horizontal line of sight to the passenger sitting in the seat immediately aft the passenger seat.

The backing plate has a front surface facing away from the backside of the passenger seat. A vertically-oriented channel is positioned in the backing plate through the front surface and adapted for receiving a vertically-oriented rail on a rear side of the base of the folding tray assembly. The rail is movable in a vertical direction within the channel to permit the vertical movement of the folding tray assembly relative to the backing plate, and therefore permit height adjustability of the personal device carrier to accommodate passengers of varying heights.

In other aspects of the disclosure, the personal device carrier has a spring-loaded locking pin that serves a dual purpose. The locking pin is adapted for selectively locking the folding tray assembly at a plurality of heights relative to the backing plate. The locking pin is also adapted for selectively retaining the tray in the vertical stowed position and releasing the tray for movement to the horizontal deployed position.

In yet other aspects of the disclosure, an aircraft passenger seat is provided with a front side configured to receive a passenger and a backside having an integrated food tray and an integrated personal device carrier positioned above the food tray. The integrated personal device carrier is adjustable in a vertical direction and may be selectively locked in a plurality of vertical positions to accommodate passengers of different heights. The backside of the aircraft passenger seat may have a recess for receiving the backing plate of the personal device carrier or other structural elements for integrating the personal carrier device with the backside of the passenger seat such that a tray of the personal device carrier is adjustably movable in a vertical direction.

A further aspect of the disclosure is a method for carrying a personal device on a passenger seat for viewing by a passenger seated in an immediately aft passenger seat. In the disclosed method, a backing plate of a personal device carrier is coupled to the backside of the passenger seat above an integrated food tray, and preferably removably coupled to provide for easy installation, repair or replacement of the personal device carrier. A folding tray assembly of the personal carrier device is adjustably coupled to the backing plate for vertical movement of the folding tray assembly relative to the backing plate. The folding tray assembly may be adjustably coupled to the backing plate before or after the backing plate is coupled to the backside of the passenger seat.

A still further aspect of the disclosure is a method for viewing a personal device from a first passenger seat positioned immediately aft of a second passenger seat. In the method, a tray of a personal device carrier that has been integrated into a backside of the second passenger seat above a food tray is moved from a generally vertical stowed position to a generally horizontal deployed position. A personal device carrier is positioned in an upright orientation on the tray of the personal device carrier for viewing by the passenger seated in the first passenger seat. The height of the personal device carrier is adjusted such that the personal device is in a line of sight of the passenger seated in the first passenger seat. The height may be adjusted before or after the personal device carrier is positioned on the tray.

The features, functions and advantages that have been discussed, as well as other objects, features, functions and advantages of the personal device carrier can be achieved independently in various examples of the disclosure or may be combined in yet other examples, further details of which can be seen with reference to the following description and drawings.

DETAILED DESCRIPTION

In the following detailed description, various examples of a personal device carrier and a passenger seat having an integrated personal device carrier are described and shown with reference to passenger seats for a vehicle, and more particularly to passenger seats for airplanes, to illustrate the general principles of the present disclosure. The description is merely exemplary in nature and is not intended to limit the disclosed personal device carrier, or the application and uses of the disclosed personal device carrier. The present disclosure may be practiced in other analogous applications or environments and/or with other analogous or equivalent variations of the illustrative examples. For example, the teachings of this disclosure may be applied to other types of passenger aircraft, rotorcraft or aerial vehicles, as well as boats, ships and other watercraft, trains, automobiles, trucks, buses, or other types of transportation where passengers may desire to use their personal devices while seated. It should be noted that those methods, procedures, components, or functions which are commonly known to persons of ordinary skill in the field of the disclosure are not described in detail herein.

Referring now to the drawings, which are for purposes of illustrating various non-limiting, exemplary embodiments of the disclosure, FIGS. 1-3 and 6 show a backside 12 (or seatback) of a passenger seat 10 of the type that may be found in premium or economy cabins of a commercial aircraft. The passenger seat 10 has the backside 12 and a front side 14 configured to receive a passenger. The front side 14 is opposite of the backside 12. The front side 14 may also be configured with an armrest 16 extending therefrom. The backside 12 of the passenger seat 10 includes an integrated food tray 18 and an integrated personal device carrier 20 positioned above and spaced apart from the food tray 18. Accordingly, the personal device carrier 20 and the food tray 18 can be used simultaneously by a passenger sitting in a seat immediately aft of the passenger seat 10. The food tray 18 deploys from a stowed position (shown in FIGS. 1-3 and 6) generally flush against the backside of the seat to a substantially horizontal deployed position (not shown) at a height close the passenger's lap where the passenger can comfortably use the food tray 18 for food, drink, or other refreshments, or as a work surface.

The personal device carrier 20 also deploys from a generally vertical, stowed position (FIG. 2) substantially flush against the backside 12 of the passenger seat 10 to a generally horizontal, deployed position (FIG. 1) where a personal device 22, such as a smartphone, tablet, or other small electronic device may be positioned in an upright orientation for optimal viewing. The personal device carrier 20 is adjustable in height relative to a top of the passenger seat 10 to enable passengers of varying heights to align a viewing area on the personal device 22 with a comfortable horizontal line of sight. When the food tray 18 and the personal device carrier 20 are deployed at the same time, a passenger can simultaneously enjoy food or other refreshments while comfortably watching a video on the personal device 22.

The personal device carrier 20 includes a backing plate 24 integrated into the backside 12 of the passenger seat 10 and a folding tray assembly 26 adjustably coupled to the backing plate 24 for vertical movement of the folding tray assembly 26 relative to the backing plate 24. The folding tray assembly 26 can be selectively locked in a plurality of vertical positions relative to the backing plate 24 to permit a passenger to select an optimal height relative to a top of the passenger seat 10 for viewing the personal device 22.

Figure 4:
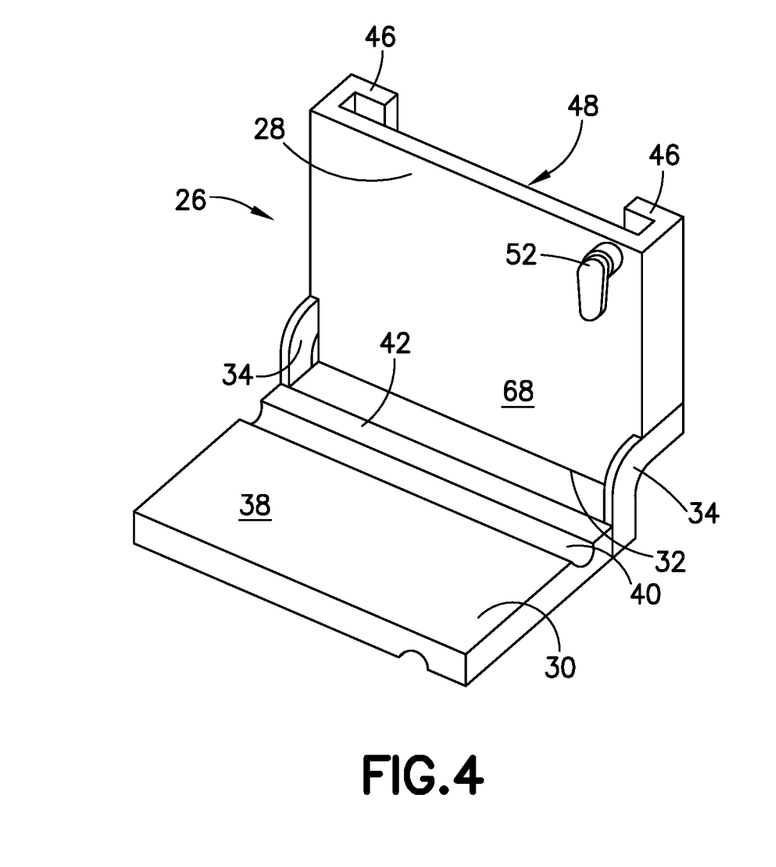
FIG. 4 is a perspective view of a folding tray assembly for the personal device carrier.

Referring more particularly to FIG. 4, the folding tray assembly 26 includes an upright base 28 and a tray 30 rotationally or pivotally mounted to the base 28 proximate a bottom edge 32 of the base 28. The base 28 and tray 30 may be coupled together about a hinge 34 or other device that is suitable for rotationally or pivotally mounting two parts together. The tray 30 is movable between a generally vertical, stowed position (FIG. 2), where the tray 30 is substantially flush against the base 28, and a generally horizontal, deployed position (FIGS. 1 and 4), where the tray 30 is folded down and away from the base 28 such that a top surface 38 of the tray 30 provides a generally horizontal surface for holding a passenger's personal device 22.

A notch 40 is recessed into the top surface 38 of the tray 30. The notch 40 is positioned substantially parallel to the bottom edge 32 of the base 28 and to a pivoting end 42 of the tray 30. The notch 40 is positioned proximate to (up to about 1 inch (2.54 cm)) the bottom edge 32 of the base 28 to interface with and position the personal device 22 in an upright orientation for optimal viewing. The personal device 22 can lean against the base 28 when a bottom edge of the personal device 22 is positioned in the notch 40. The notch 40 can be coated with a non-slip material or have other surface treatments that provide friction to prevent lateral movement of the personal device 22. In other embodiments, the top surface 38 of the tray 30 may have more than one notch 40, the additional notches positioned parallel to and further away from the base 28 to provide a passenger with the ability to adjust the upright orientation of the personal device 22 by selecting one of the notches 40. The folding tray assembly should have a width of up to about 14 inches (35.56 cm) to accommodate different size personal devices 22. The notch 40 should have a height (downward from the top surface 38) and depth (from front to back) sufficient to hold the personal device 22 in an upright position. The height should not be too deep to interfere with the viewing area of the personal device 22. A notch 40 having a height and depth of about 0.75 inch (1.905 cm) is suitable for most current types of personal device 22. The notch 40 is shown as having a circular configuration; however, a notch 40 having a square or rectangular configuration would also be suitable.

Figure 3:
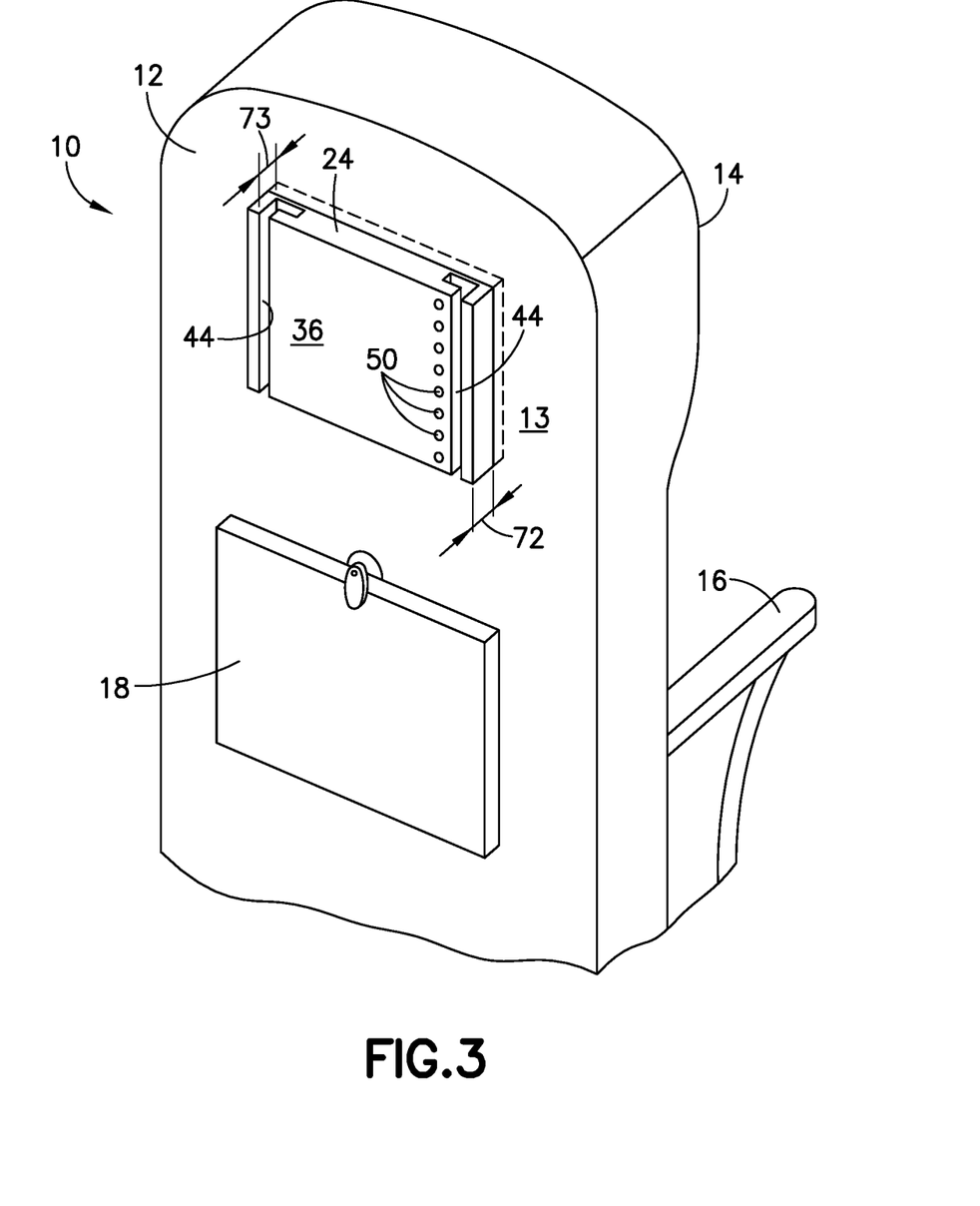
FIG. 3 is a partial perspective view of a backside, top side, and right side of a passenger seat having an integrated personal device carrier with the folding tray assembly removed.

Referring to FIG. 3, the backing plate 24 has a front surface 36 that faces away from and is substantially parallel to the backside 12 of the passenger seat 10. The backing plate 24 is partially recessed into the backside 12 of the passenger seat 10 to define a backing plate depth 72 external to a surface of the backside 12. For example, referring to FIG. 6, the backside 12 of the passenger seat 10 is configured with a recess 76 positioned above the food tray 18 for receiving the backing plate 24. The recess 76 has a shape and size that matches the shape and size of the personal device carrier 20 and permits the backing plate 24 of the personal device carrier 20 to be inserted therein. The recess 76 defines side walls 78 around a periphery 80 of the recess 76. The side walls 78 have a recess depth 82 that is less than a total depth of the backing plate 24, such that when the backing plate 24 is installed into the recess 76, a front surface 36 of the backing plate 24 is above the surface 13 of the backside 12. Thus, the backing plate 24 extends beyond the surface 13 of the backside. The backing plate 24 is coupled to the backside 12 of the passenger seat 10 through the recess 76, and preferably removably coupled such that the personal carrier device 20 can be easily installed and removed for repair, maintenance or replacement. For example, the backing plate 24 may be coupled within the recess 76 with an adhesive, with bolts and screws, with depressible tabs that snap the backing plate 24 into the recess 76 or with any other mechanical means for removably coupling the backing plate 24 into the recess 76.

To enable vertical movement of the folding tray assembly 26 relative to the backing plate 24, the backing plate 24 has a vertically-oriented channel 44 recessed therein and adapted to receive a vertically-oriented rail 46 on a rear side 48 of the base 28 of the folding tray assembly 26. The vertically-oriented rail 46 nests into the vertically-oriented channel 44 and is movable in a vertical direction within the channel 44 to permit vertical movement of the folding tray assembly 26 relative to the backing plate 24. The channel 44 should not be recessed past the surface 13 of the backside 12 of the passenger seat 10 so as not to impede vertical movement of the folding tray assembly 26, i.e., the channel 44 has a channel depth 73 of no more than the backing plate depth 72. The exemplary embodiment shown in the drawings includes two channels 44 and two rails 46, each positioned proximate side edges of the backing plate 24 and the base 28 of the folding tray assembly 26, respectively. In other embodiments, a single channel 44 and a single rail 46 may be configured in the center of the backing plate 24 and the base 28, respectively. The channel 44 and the rail 46 should be configured with shapes that complement each other and provide for nesting together to prevent the rail 46 from separating from the channel 44, and for sliding relative to one another. A stop may be provided in the channel to prevent the rail 46 from sliding completely out of the top or bottom of the channel 44. Other structural elements for integrating the personal carrier device 20 with the backside 12 of the passenger seat 10 may be used to enable the personal device carrier 20 to be adjustably movable in a vertical direction.

Referring to FIG. 3, a plurality of holes 50 are defined through the front surface 36 of the backing plate 24 and oriented in a spaced apart vertical direction to provide for selectively locking the folding tray assembly 26 in a plurality of vertical positions relative to the backing plate 24. The holes 50 are positioned from a top of the backing plate 24 to a bottom of the backing plate 24 to provide for maximum adjustment of the height of the folding tray assembly 26.

Figure 5:
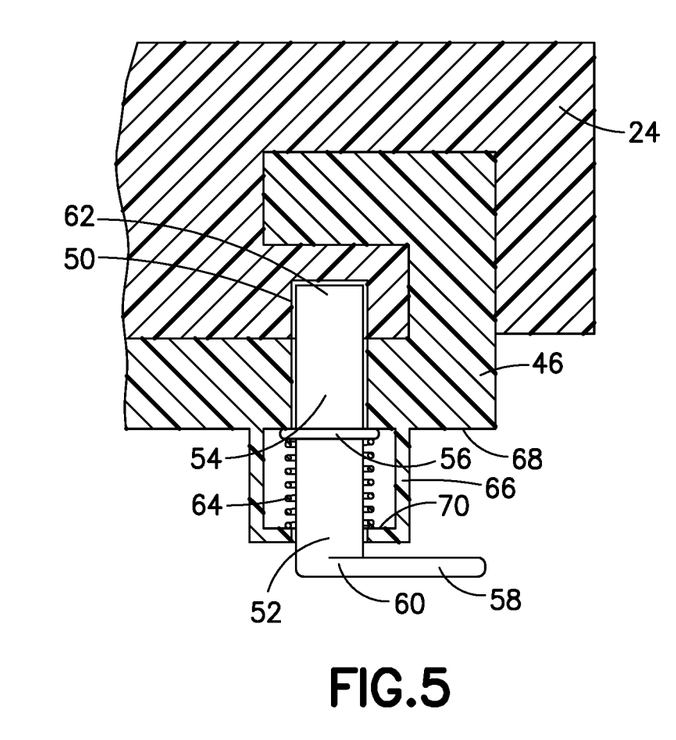
FIG. 5 is a partial cross-sectional view of the personal device carrier showing the backing plate, base of the folding tray assembly, and a locking pin.
Figure 6:
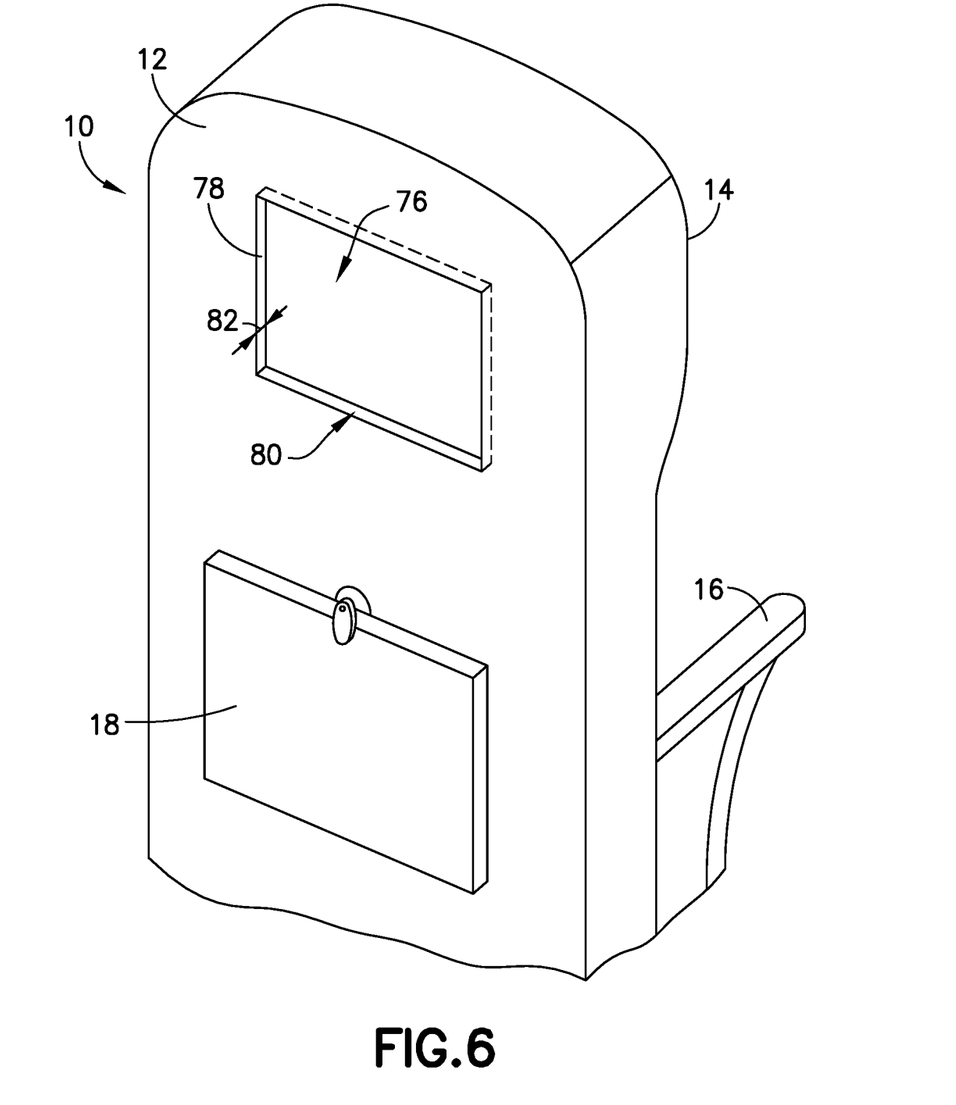
FIG. 6 is a partial perspective view of a backside, top side, and right side of a passenger seat having a recess in a backside of the passenger seat for receiving and integrating a personal device carrier into the backside.

At least one spring-loaded locking pin 52 is positioned to extend through the base 28 of the folding tray assembly 26 and be engageable with the holes 50 in the backing plate 24 for selectively locking the folding tray assembly 26 at a plurality of heights. The holes 50 and spring-loaded locking pin 52 may be positioned proximate one side of the personal device carrier 20 (as shown in FIG. 3) or may be positioned in a central area of the personal device carrier 20 or a second set of holes 50 and a second spring-loaded locking pin 52 may be positioned proximate another side of the personal device carrier 20. Referring to FIG. 5, the locking pin 52 comprises a shaft 54 and a hooked front end 58 positioned in front of the base 28 of the folding tray assembly 26 in a generally perpendicular direction away from a proximal end 60 of the shaft 54. The locking pin 52 and the hooked front end 58 are rotatable about the shaft 54 for releasably engaging the tray 30 in the stowed position (shown in FIG. 2). The shaft 54 has a ring 56 surrounding the shaft 54 proximate a central position of the shaft 54 between the proximal end 60 and a distal end 62 of the shaft 54. The ring 56 may be annular or any other suitable shape that surrounds the shaft 54.

The shaft 54 passes through a spring chamber 66 on an outer surface 68 of the base 28 of the folding tray assembly 26, such that the spring chamber 66 is positioned between the hooked front end 58 of the locking pin 52 and the outer surface 68. A spring 64 is positioned inside the spring chamber 66 about the shaft 54 of the locking pin 52 between the ring 56 and an inner front surface 70 of the spring chamber 66 and the hooked front end 58. The spring 64 is biased to push the ring 56 toward the outer surface 68, and therefore biases the locking pin 52 in a locked position where the distal end 62 of the shaft 54 extends into one of the holes 50 in the backing plate 24. The distal end 62 of the shaft 54 can be disengaged from the holes 50 by pulling the hooked front end 58 of the locking pin 52 out away from the outer surface 68 (i.e., toward the passenger) and out from the holes 50. When disengaged, the folding tray assembly can be moved in a vertical direction, and then locked in a new position by releasing the locking pin 52 to engage with another one of the holes 50. Therefore, the locking pin 52 serves the dual purposes of locking the folding tray assembly 26 in a desired vertical position (by pulling the locking pin 52 out and releasing it to engage with one of the holes 50 in the backing plate 24) and releasably locking the tray 30 in a stowed position (by rotating the locking pin 52 to enable the hooked front end 58 to engage a bottom surface 74 of the tray 30).

Figure 1:
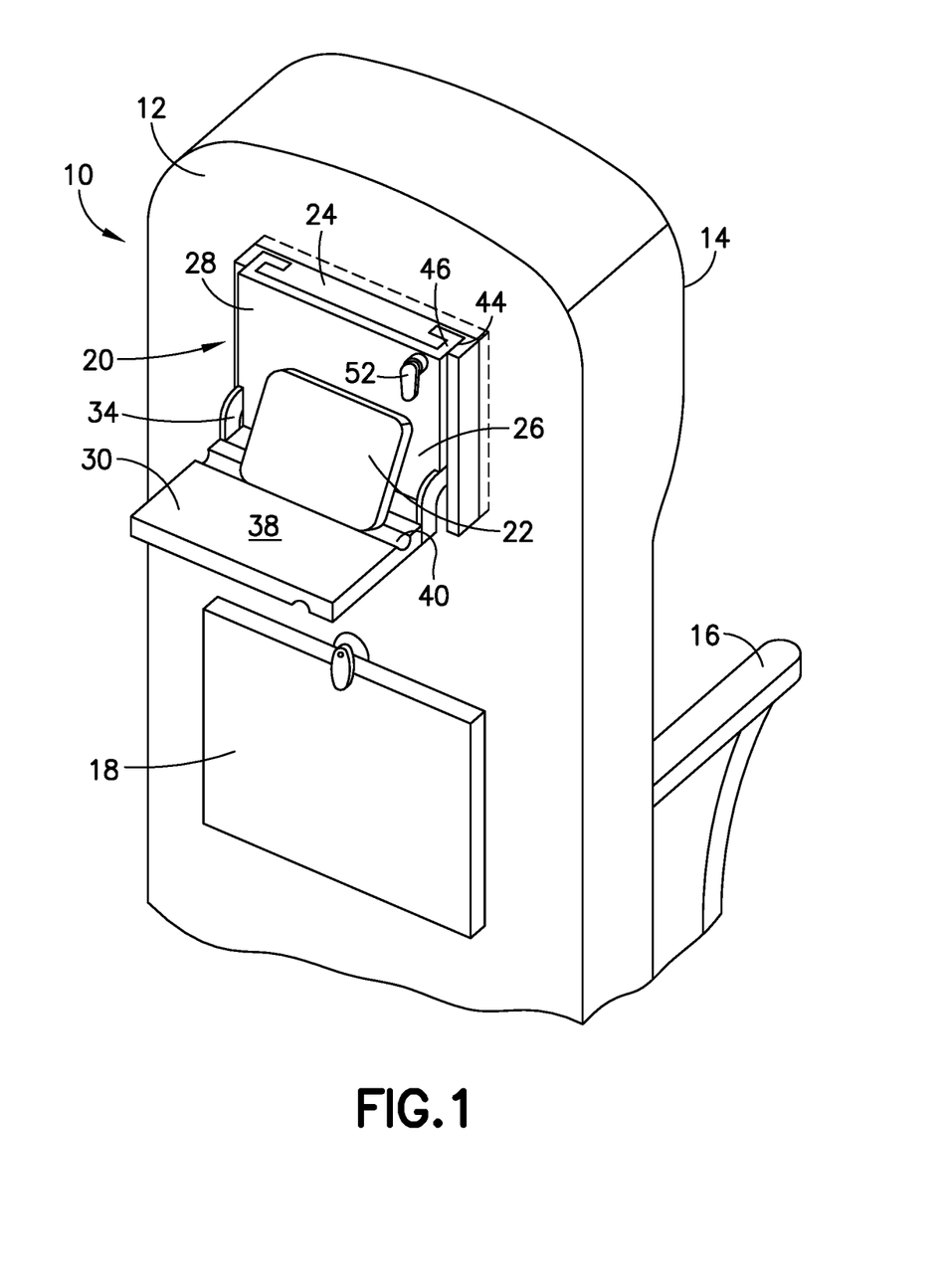
FIG. 1 is a partial perspective view of a backside, top side, and right side of a passenger seat with an integrated personal device carrier in a generally horizontal deployed position.
Figure 2:
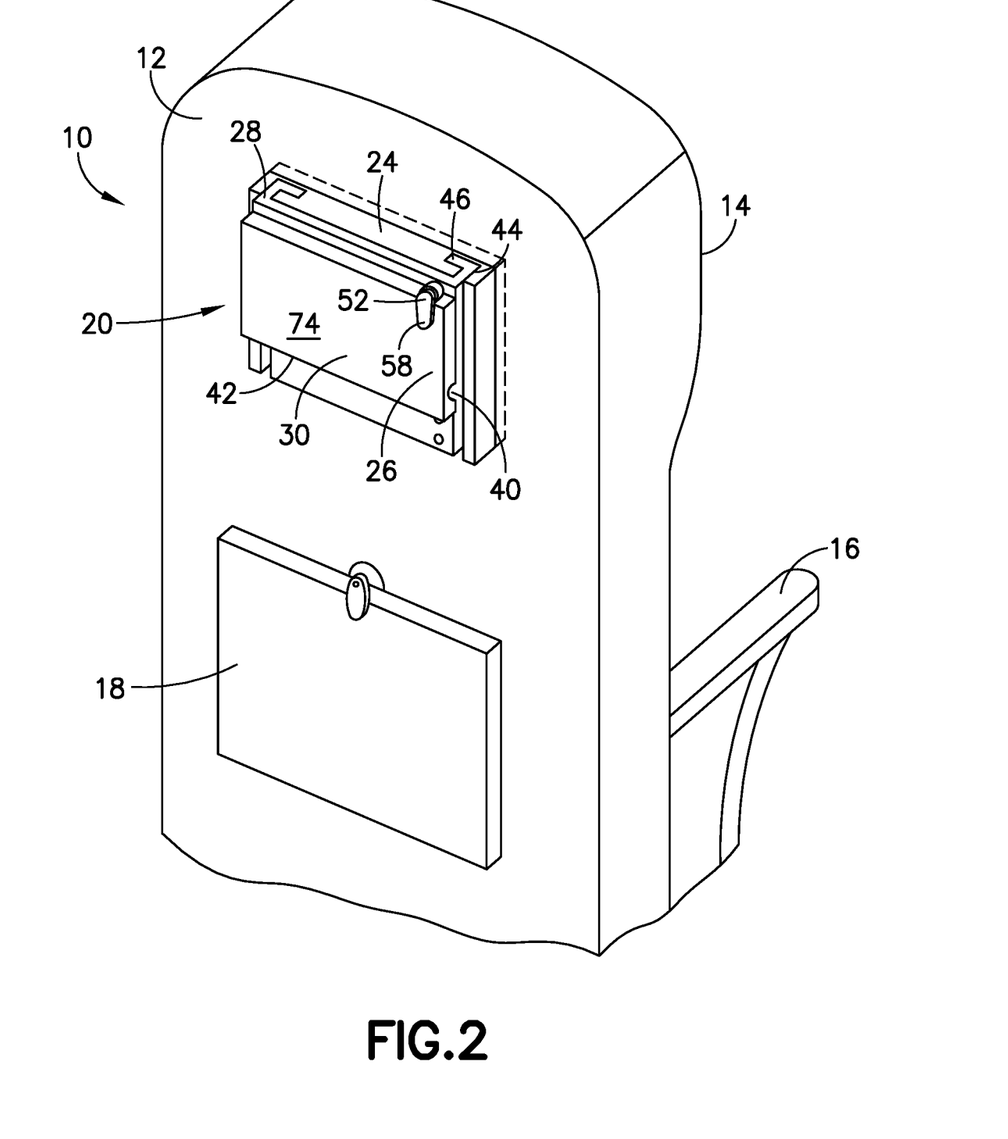
FIG. 2 is a partial perspective view of a backside, top side, and right side of a passenger seat with an integrated personal device carrier in a generally vertical stowed position.

A further aspect of this disclosure is a method for carrying a personal device 22 on a passenger seat 10 for viewing by a passenger seated in an immediately aft passenger seat 10. The method includes the following steps: coupling a backing plate 24 of a personal device carrier 20 to the backside 12 of the passenger seat 10 above an integrated food tray 18, and preferably removably coupling the backside 12 to the passenger seat 10 to provide for easy installation, maintenance, repair or replacement of the personal device carrier 20; and adjustably coupling a folding tray assembly 26 of the personal carrier device 22 to the backing plate 24 for vertical movement of the folding tray assembly 26 relative to the backing plate 24. The folding tray assembly 26 may be adjustably coupled to the backing plate 24 before or after the backing plate 24 is coupled to the backside 12 of the passenger seat 10. In this method, a passenger seat 10 may be crafted as a new passenger seat 10 with, or an existing passenger seat 10 may be modified to include, a recess 76 in the backside 12 of the passenger seat 10 above the integrated food tray 18. The backing plate 24 of the personal device carrier 20 is positioned partially in the recess 76 as shown in FIGS. 1 and 2 and described above, and removably coupled to the backside 12 of the passenger seat 10 through the recess 76 as described above. The method may also include removing the backing plate 24 from the recess 76 for repair, maintenance, or replacement of the personal device carrier 20. In this method, the personal device carrier 20 may be inserted into the recess 76 as an assembled unit (i.e., backing plate 24 and folding tray assembly 26 pivotally connected to each other) or the backing plate 24 may be inserted into the recess 76 and then the folding tray assembly can be pivotally connected thereto.

A method of using the personal device carrier 20 for viewing a personal device 22 from a first passenger seat 10 positioned immediately aft of a second passenger seat 10 is also provided. In the method, the tray 30 of the folding tray assembly 26 of the personal device carrier 20 that has been integrated into a backside 12 of the second passenger seat 10 above a food tray 18 is moved from a generally vertical stowed position (FIG. 2) to a generally horizontal deployed position (FIG. 1). A personal device 22 is positioned in an upright orientation in a notch 40 recessed into a top surface 38 of the tray 30 of the personal device carrier 20 for viewing by the passenger seated in the first passenger seat 10. The height of the personal device carrier 20 is adjusted such that the personal device 22 is in a line of sight of the passenger seated in the first passenger seat 10. The height of the personal device carrier 20 may be adjusted before or after the personal device 22 is positioned on the tray 30 and before or after the tray 30 is moved from the stowed position to the vertical position. In this method, the spring-loaded locking pin 52 is pulled out (away from the backside 12 of the passenger seat 10) to disengage the locking pin 52 from one of the holes 50 through front surface 36 of the backing plate 24 and permit the base 28 of the folding tray assembly 26 to be moved in a vertical direction relative to the backing plate 24 and adjusted to a desired vertical position that permits the personal device 22 to be in a desired horizontal line of sight for a passenger seated in the second passenger seat 10. The locking pin 52 can then be released so that it extends into another one of the holes 50. This method can be repeated as necessary for different passengers of varying heights to permit comfortable viewing of a personal device 22.

Many other modifications and variations may of course be devised given the above description for implementing the principles in the present disclosure. For example, and without limitation, other types of adjustment means may be used for providing vertical movement of the personal device carrier 20 including a channel 44 having a different shape and a correspondingly shaped rail 46, fewer or more holes 50 may be provided, a second plurality of holes 50 may be provided with a corresponding second locking pin 52, or other locking means may be provided in the channel 44 or on the rail 46 for frictional or other type of inter-engagement. It is intended that all such modifications and variations be considered as within the spirit and scope of this disclosure, as defined in the following claims.

The invention claimed is:

1. A personal device carrier for a passenger seat, the personal device carrier comprising:
a backing plate partially recessed into a backside of the passenger seat to define a backing plate depth external to a surface of the backside, the backing plate comprising a front surface facing away from the backside, the front surface having a vertically-oriented channel therein with a channel depth of no more than the backing plate depth; and
a folding tray assembly comprising a base having a vertically-oriented rail on a rear side of the base adjustably coupled to the vertically-oriented channel in the backing plate for vertical movement of the folding tray assembly relative to the backing plate and a tray rotationally mounted to the base, the tray being movable between a generally vertical stowed position and a generally horizontal deployed position for holding a personal device.

2. The personal device carrier of claim 1, wherein the rail is movable in a vertical direction within the channel to permit the vertical movement of the folding tray assembly relative to the backing plate.

3. The personal device carrier of claim 1, further comprising:

a plurality of holes defined through the front surface of the backing plate, the plurality of holes being oriented in a spaced apart vertical direction; and
a spring-loaded locking pin extending through the base of the folding tray assembly and engageable with the holes in the backing plate for selectively locking the folding tray assembly at a plurality of heights.

4. The personal device carrier of claim 3, wherein the spring-loaded locking pin is rotatable and comprises a hooked front end extending away from the base of the folding tray assembly for releasably engaging the tray in the stowed position.

5. The personal device carrier of claim 3, further comprising a spring positioned about a shaft of the locking pin, the spring configured to bias the locking pin in a locked position with a distal end of the shaft extending into one of the holes.

6. The personal device carrier of claim 5, wherein the shaft of the locking pin passes through a spring chamber positioned between a hooked front end of the locking pin and the front surface of the base of the folding tray assembly, the shaft having a ring positioned within the spring chamber between the spring and the front surface of the base of the folding tray assembly, the spring engaging an inner front surface of the spring chamber and the ring for biasing the locking pin the locked position.

7. The personal device carrier of claim 1, wherein the tray is pivotally attached proximate to a bottom edge of the base of the folding tray assembly.

8. The personal device carrier of claim 7, further comprising a notch recessed into a top surface of the tray, the notch being substantially parallel to the bottom edge of the base, the notch configured to interface with and position the personal device in an upright orientation for viewing.

9. The personal device carrier of claim 8, wherein the notch is positioned within about 1 inch from a pivoting end of the tray.

10. An aircraft passenger seat comprising:
a front side configured to receive a passenger, and
a backside comprising:
an integrated food tray; and
an integrated personal device carrier positioned above the food tray, the personal device carrier comprising a backing plate partially recessed into a backside of the passenger seat to define a backing plate depth external to a surface of the backside, the backing plate having a surface with a vertically-oriented channel therein with a channel depth of no more than the backing plate depth and a folding tray assembly comprising a base having a vertically-oriented rail on a rear side surface of the base adjustably coupled to the vertically-oriented channel in the backing plate for vertical movement of the folding tray assembly relative to the backing plate and a tray rotationally mounted to the base, the tray being movable between a generally vertical stowed position and a generally horizontal deployed position for holding a personal device.

11. The aircraft passenger seat of claim 10, wherein the backside of the passenger seat comprises a recess for receiving the backing plate, the recess positioned above the food tray.

12. The aircraft passenger seat of claim 11, wherein the recess defines side walls around a periphery of the recess, the side walls having a recess depth that is less than a total depth of the backing plate, such that when installed into the recess, the backing plate extends beyond a surface of the backside to the backing plate depth.

13. The aircraft passenger seat of claim 12, wherein the backing plate comprises a front surface facing away from the backside of the passenger seat, the vertically-oriented channel recessed into the front surface and adapted for receiving a vertically-oriented rail on a rear side of the base of the folding tray assembly, the rail being movable in a vertical direction within the channel to permit the vertical movement of the folding tray assembly relative to the backing plate.

14. A method for carrying a personal device on a passenger seat for viewing by a passenger seated in an immediately aft passenger seat, the passenger seat having a front side configured to receive a passenger and a backside having an integrated food tray, the method comprising:

creating a recess in the backside of the passenger seat above the integrated food tray;

positioning a backing plate of a personal device carrier partially in the recess to define a backing plate depth external to a surface of the backside, the backing plate further defining a vertically-oriented channel through a front surface of the backing plate having a channel depth that is less than the backing plate depth, coupling the backing plate to the backside of the passenger seat through the recess; and adjustably coupling a folding tray assembly to the backing plate for vertical movement of the folding tray assembly relative to the backing plate.

15. The method of claim 14, wherein the step of coupling the backing plate to backside of the passenger seat comprises: removably coupling the backing plate to the backside.

16. The method of claim 15, further comprising the step of: removing the backing plate from the recess.

* * * * *